US009180424B2

(12) United States Patent
Wey

(10) Patent No.: US 9,180,424 B2
(45) Date of Patent: Nov. 10, 2015

(54) INFRARED ASSISTED HYDROGEN GENERATION

(76) Inventor: Albert Chin-Tang Wey, Westmont, IL (US)

(*) Notice: Subject to any disclaimer, the term of this patent is extended or adjusted under 35 U.S.C. 154(b) by 214 days.

(21) Appl. No.: 12/930,812

(22) Filed: Jan. 18, 2011

(65) Prior Publication Data

US 2012/0061232 A1 Mar. 15, 2012

Related U.S. Application Data

(63) Continuation of application No. 12/807,652, filed on Sep. 11, 2010, now abandoned.

(51) Int. Cl.
  C25B 1/20 (2006.01)
  C01B 3/02 (2006.01)
  B01J 19/12 (2006.01)
  B01J 19/08 (2006.01)
  C25B 1/00 (2006.01)
  B01J 19/24 (2006.01)
  C25B 1/02 (2006.01)

(52) U.S. Cl.
  CPC ............. B01J 19/087 (2013.01); B01J 19/128 (2013.01); B01J 19/2475 (2013.01); C01B 3/02 (2013.01); C25B 1/003 (2013.01); C25B 1/02 (2013.01)

(58) Field of Classification Search
  CPC .... B01J 19/087; B01J 19/128; B01J 19/2475; C01B 3/02; C25B 1/02; C25B 1/003
  USPC ...................................... 204/157.52; 205/412
  See application file for complete search history.

(56) References Cited

U.S. PATENT DOCUMENTS

| 1,446,736 | A | * | 2/1923 | Granger ........................ 205/412 |
| 2,299,260 | A | * | 10/1942 | Sivian ............................ 136/207 |
| 3,511,991 | A | * | 5/1970 | Beerman ................. 374/E7.002 |
| 4,553,025 | A | * | 11/1985 | Raskov ....................... 219/463.1 |
| 5,077,461 | A | * | 12/1991 | Hasegawa ..................... 428/372 |
| 5,399,251 | A | * | 3/1995 | Nakamats ..................... 204/262 |
| 5,446,334 | A | * | 8/1995 | Gaffney ..................... 250/338.3 |
| 5,618,394 | A | * | 4/1997 | Patterson ..................... 204/284 |
| 5,980,700 | A | * | 11/1999 | Iritani ...................... 204/157.62 |
| 6,026,788 | A |   | 2/2000 | Wey |
| 6,082,339 | A |   | 7/2000 | Wey |
| 6,833,553 | B2 | * | 12/2004 | Slingo ....................... 250/504 R |

(Continued)

OTHER PUBLICATIONS

Neese et al, "Large Electrocaloric Effect in Ferroelectric Polymers Near Room Temperature," Science Aug. 8, 2008, vol. 321, No. 5890, pp. 821-823.*

(Continued)

*Primary Examiner* — Keith Hendricks
*Assistant Examiner* — Colleen M Raphael
(74) *Attorney, Agent, or Firm* — Iphorgan Ltd.

(57) ABSTRACT

This invention relates to a system and a method for achieving efficient production of hydrogen in a hydrogen generator, comprising at least a hydrogen generator, a liquid in said hydrogen generator to produce hydrogen from, and a ceramic that emits infrared at wavelengths covering at least a portion of 3-20 micrometers range so that said liquid can be excited with infrared at said wavelengths before or during the production of hydrogen for improved hydrogen production efficiency. The use of infrared-excited electrolyte solution in a hydrogen generator helps reduce the energy consumption, lower operating voltage, and thus reduce the cost of the production of hydrogen.

12 Claims, 2 Drawing Sheets

(56) References Cited

U.S. PATENT DOCUMENTS

| | | | |
|---|---|---|---|
| 7,281,526 B2* | 10/2007 | Keiichiro et al. | 123/538 |
| 7,357,912 B2 | 4/2008 | Sakai et al. | |
| 7,485,160 B2 | 2/2009 | Kitada | |
| 7,604,728 B2 | 10/2009 | Schlager | |
| 7,617,815 B2 | 11/2009 | Wey | |
| 7,641,889 B1 | 1/2010 | Salinas et al. | |
| 7,674,358 B2 | 3/2010 | Gibson et al. | |
| 7,766,986 B2 | 8/2010 | Toseland et al. | |
| 2006/0213124 A1* | 9/2006 | Maruchi | 48/61 |
| 2006/0226001 A1* | 10/2006 | Cravens | 204/280 |
| 2007/0205111 A1* | 9/2007 | Bayliss | 205/637 |
| 2008/0213641 A1* | 9/2008 | Ostermann et al. | 204/280 |
| 2010/0008849 A1* | 1/2010 | Martin | 423/657 |
| 2010/0012479 A1* | 1/2010 | Xu et al. | 204/164 |
| 2010/0135899 A1* | 6/2010 | Luo et al. | 204/157.52 |

OTHER PUBLICATIONS

Hamid, S.A. "Tourmaline as a pyroelectric infra-red radiation detector," Zeitschrift fuer Kristallographie, vol. 151, No. 1-2, pp. 67-75(1980) (Abstract & p. 67 provided).*

NIST "Water, IR spectrum," available online at http://webbook.nist.gov/cgi/cbook.cgi?Scan=cob10116&Type=IR.*

NIST, "Water, Vibrational and/or electronic energy levels," available online at http://webbook.nist.gov/cgi/cbook.cgi?ID=C7732185&Units=SI&Mask=800.*

Lameiras et al, "Backgrounds for the Industrial Use of Black Tourmaline Based on Its Crystal Structure Characteristics," Ferroelectrics, vol. 77, pp. 107-119, 2008.*

* cited by examiner

INFRARED ASSISTED HYDROGEN GENERATION

CROSS-REFERENCE TO RELATED APPLICATIONS

This application is a continuation application of prior Application No. 12/807,652, filed on Sep. 11, 2010.

BACKGROUND

1. Field of Invention

This invention relates to a system and a method for achieving efficient production of hydrogen in a hydrogen generator, comprising at least a hydrogen generator, a liquid used by said hydrogen generator to produce hydrogen from, and a ceramic that emits infrared at wavelengths covering at least a portion of 3-20 micrometers range so that said liquid can be excited by infrared at said wavelengths before or during the production of hydrogen for improved production efficiency to reduce energy consumption and cost.

2. Description of Prior Art

One of the long-lasting problems with hydrogen generation for commercial purposes, such as running hydrogen cars or producing hydrogen for fuel cells and fuel enrichment in internal combustion engines, has been that the voltage required for the process has been inefficient and the cost of the process nearly offsets the gain. The inventor recognized that it would be of great benefit to produce hydrogen in a more efficient way to overcome the limitation of using hydrogen as fuel caused by the cost and difficulty of hydrogen production.

The present inventor has been researching and experimenting for years with infrared (IR) excitation effect on hydrocarbon fuels and discovered the use of IR radiation at 3-20 μm (micrometers) wavelengths for enhancing hydrocarbon fuel efficiency of engines, which resulted in the inventions of fuel combustion enhancement devices as disclosed in the U.S. Pat. Nos. 6,026,788, 6,082,339 and 7,617,815. The infrared at 3-20 μm wavelength range is defined as "mid-infrared" by the U.S. NASA, but "far infrared" in Japanese convention.

While researching IR-effect on hydrocarbons, the inventor realized that the chemical bonds in molecules can be photoexcited with infrared shorter than 20 μm in wavelengths. When a photon is absorbed by a molecule, it ceases to exist and its energy is transferred to the molecule in one of vibrational, rotational, electronic, and translational forms. These molecules include water and most organic or inorganic compounds in liquid form. They absorb IR photons in 3-20 μm wavelengths to cause molecular vibrations.

For example, the IR vibrational absorption spectrum of liquid water may consist of 2.87 μm (asymmetric stretch), 3.05 μm (symmetric stretch), 4.65 μm (bend and librations), and 6.08 μm (bend). In addition, the intermolecular hydrogen bonding between water molecules can absorb 3.3 μm infrared to vibrate that reduces cluster size of water molecules. As disclosed in aforementioned U.S. patents by the present inventor, all hydrocarbons are known to be IR-active. Furthermore, IR vibrational absorption spectrum for other molecules can also be found in Organic Chemistry textbooks.

Due to the simplicity of electrolysis process and the equipment, conventional water-based electrolysis systems have been widely used in portable or stationary hydrogen generators for small or large hydrogen generation. Numerous techniques and systems have been developed involving various electrolytic solutions and electrolyzers, for examples, in U.S. Pat. Nos. 7,357,912, 7,485,160, 7,604,728, 7,641,889, 7,674,358, and 7,766,986, just to name a few of the latest inventions.

Hydrogen electrolysis is the process of running an electrical current through aqueous solution and separating hydrogen from oxygen or other elements in the solution. During the development of IR-fuel technology, the present inventor started realizing the potential benefit of improving hydrogen production efficiency in hydrogen electrolysis by exciting the electrolytes with infrared at 3-20 μm wavelengths to improve its chemical reaction rate.

In Quantum Mechanics, the reaction rate W is determined by Arrhenius equation:

$$W = Rke^{-E/RT} \quad (1)$$

where k is a constant, R the universal gas constant, T temperature in Kelvin °K, and E the activation energy required to overcome the activation barrier.

According to Arrhenius equation (1), it is easily comprehended that raising the reaction temperature T would increase reaction rate W. However, in 1930's Evans and Polanyi disclosed that increasing the reactant vibrational energy is the most effective at promoting reaction. Their expectation was that if the vibrational excitations were sufficient to lower the activation barrier of reactants E, substantial rate enhancement would be realized. Increasing vibrational energy will reduce activation energy E and thus increase reaction rate W.

Using water electrolysis as an example, the electrolysis of one mole of water produces a mole of hydrogen gas and a half-mole of oxygen gas in their normal diatomic forms:

$$H_2O \rightarrow H_2 + \tfrac{1}{2}O_2 \quad (2)$$

A detailed analysis of the process makes use of the thermodynamic potentials and the first law of thermodynamics. The Gibbs free energy of above reaction is defined by $$G = U - TS + PV \quad (3)$$

in which U is internal energy, T absolute temperature, S final entropy, P absolute pressure, and V final volume. This process is presumed to be at 298° K (deg Kelvin) room temperature and one atmosphere pressure. Since the enthalpy H=U+PV, the change in internal energy U is then $$\Delta U = \Delta H - P\Delta V \quad (4)$$

The change in Gibbs free energy becomes:

$$\Delta G = \Delta H - T\Delta S \quad (5)$$

or ΔG=285.8 KJ−48.7 KJ=237.1 KJ. The environment helps the reaction process by contributing the amount TΔS. The utility of the Gibbs free energy is that it tells what amount of energy in other forms must be supplied to get the process to proceed. Therefore, in the process of water electrolysis, an electrical energy input equivalent to 237.1 KJ will be required from a DC power supply (or battery), which corresponds to the standard electromotoric force (emf) of the thermokinetic reaction, or 1.23 eV/e (per electron).

Based on Equation (5), the ΔG can be reduced by simply increasing the environment temperature T. For example, when the environment temperature is increased from 25° C. (or 298° K) to 65° C. (338° K), TΔS will increase from 48.7 KJ to 55.2 KJ, which reduces ΔG from 237.1 KJ to 230.6 KJ, or by 6.5 KJ. This represents a 2.7% drop in power requirement.

On the other hand, following Evans and Polanyi's suggestion to increase the reactant vibrational energy through photoexcitation can effectively promote the reaction. When irradiating $H_2O$ molecules with infrared, the ΔG can be reduced by an amount equivalent to the photon energy at the wavelength λ, (μm):

$$E(eV) = 1.2398/\lambda(\mu m) \quad (6)$$

For example, water molecule can absorb 3.05 μm wavelength photon causing symmetric stretch. It is equivalent to provide the water molecule with 0.41 eV energy from IR photon, which cuts ΔG down from 1.23 eV to 0.82 eV, or a 33% reduction. In theory, the ΔG can be further reduced by the effect of so-called Infrared Multiphoton Absorption, a molecular multiphoton process (MMP) that describes how polyatomic molecules under collision-free conditions may absorb many infrared quanta. It describes how molecule absorbs multiple photons at assorted wavelengths of its fundamental and combinational modes.

The change in Gibbs free energy ΔG in a reaction is a very useful parameter, which represents the required electrical energy to proceed the process. As described above, the introduction of IR-excitation to the electrolysis is expected to significantly reduce the energy consumption and make it possible to occur at a lower operating voltage. It therefore reduces the cost of the generated hydrogen gas.

OBJECTS AND ADVANTAGES

Accordingly, one object of this invention is to provide a system and method for achieving efficient production of hydrogen;

Another object of the present invention is to provide a simple, cost-effective system and method that improves hydrogen production efficiency of hydrogen generators and does not change the generators' specifications.

Also, one object of the present invention is to provide a simple, cost-effective system and method that will work on various hydrogen generators with different electrolyte, including water, aqueous solution, electrolyte solution, hydrocarbon fuel, solution of organic fuel or organic compounds, liquid acid or alkine electrolyte, or the like.

These objectives are achieved by a system and method of the present invention comprising at least a hydrogen generator, a liquid used by said hydrogen generator to produce hydrogen from, and a ceramic that emits infrared at wavelengths covering at least a portion of 3-20 micrometers range so that said liquid can be excited by infrared at said wavelengths before or during the production of hydrogen for improved production efficiency.

Other objects, features, and advantages of the present invention will hereinafter become apparent to those skilled in the art from the following description.

DRAWING FIGURES

REFERENCE NUMERALS IN DRAWINGS

| 11 | Infrared-emitting ceramic | 21 | Anode |
| 22 | Cathode | 23 | Electrolyte membrane |
| 31 | Liquid (water) | 32 | Liquid (hydrocarbon fuel solution) |
| 41 | Hydrogen generator | | |

SUMMARY

In accordance with the present invention a system and method for achieving efficient production of hydrogen in a hydrogen generator comprises at least a hydrogen generator, a liquid used in said hydrogen generator to produce hydrogen from, and a ceramic that emits infrared at wavelengths covering at least a portion of 3-20 micrometers range so that said liquid can be excited with infrared at said wavelengths before or during the production of hydrogen for improved hydrogen production efficiency and reduced energy consumption and cost.

DETAILED DESCRIPTION OF THE INVENTION

Figure 1:
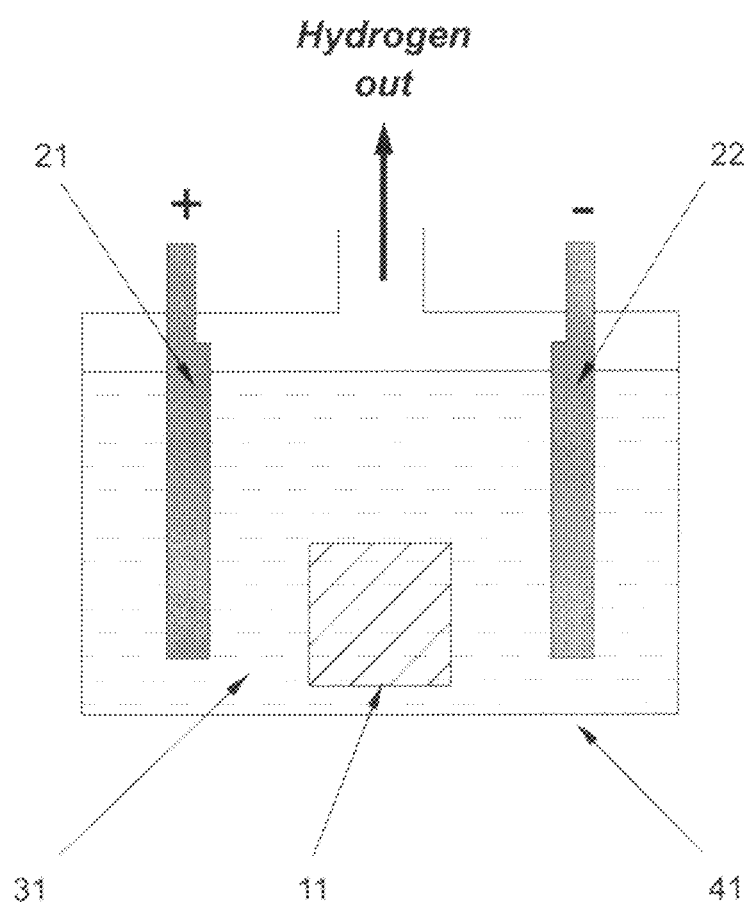
FIG. 1 is a schematic illustration showing one embodiment of the present invention with an IR-emitting ceramic immersed in electrolyte solution of a hydrogen generator.

FIG. 1 shows one embodiment of the present invention with the infrared emitting ceramic 11 immersed in electrolyte solution 31 of a hydrogen generator 41. In FIG. 1, the electrolyte solution 31 is water and the hydrogen generator 41 is a water electrolyzer. The anode 21 and cathode 22 of the electrolyzer are connected to a DC electrical power supply, or a battery, which is not shown in the figure.

The IR-emitting ceramic 11 may consist of at least one IR-emitting oxide that emits infrared at wavelengths covering at least a portion of 3-20 μm range. This IR-emitting oxide can be any of those disclosed in the U.S. Pat. Nos. 6,026,788, 6,082,339 & 7,617,815 by the present inventor, or the like. The IR-emitting ceramic 11 may take any shapes, forms, styles, patterns, and in any dimensions as allowed by practical deployments. The IR-emitting ceramic 11 can be disposed at anywhere in hydrogen generator 41 in direct contact with the electrolyte solution 31. It also can be placed at proximity of the electrolyte solution 31 without direct contact, provided infrared can penetrate the media. Infrared at said wavelengths can penetrate any nonmetal material.

When disposed in electrolyte solution 31 of a hydrogen generator 41, the IR-emitting ceramic 11 can simply absorb heat from the ambience to emit IR photons in said wavelengths and does not require any additional energy in any form other than heat.

The molecules in electrolyte solution 31 can absorb a number of IR-photons at assorted wavelengths that match its fundamental and combination vibrational modes to cause molecular vibrations, known as the molecular multiphoton process (MMP). The constituent electrons can climb up the ladder of vibrational states and reach excited states that have a lower activation barrier for reaction, which results in reduced Gibbs free energy ΔG and therefore requires less electrical energy from the power supply.

To enhance IR-excitation effect on the molecules in electrolyte solution, an effective amount of pyroelectric material may be added to the IR-emitting oxides as disclosed in previous U.S. patents by the present inventor for making IR-emitting ceramic 11. Pyroelectric materials have an ability to generate a temporary electrical potential when they are heated or cooled. This slight polarization change in crystal structure enables the orbital electrons of the transition metal oxides in the IR-emitting ceramic 11 to jump more easily and frequently. Thus, adding pyroelectric material to the mixture of infrared-emitting oxides helps the resultant ceramic significantly improve its infrared emission. Besides, the spontaneous polarization can produce an electric potential to help further reduce Gibbs free energy ΔG of the electrolyte solution and thus decrease power consumption of the electrolyzer. One of the most common pyroelectric materials is tourmaline. An about 20 weight percentage (20 wt. %) of tourmaline may be used for better results.

Figure 2:
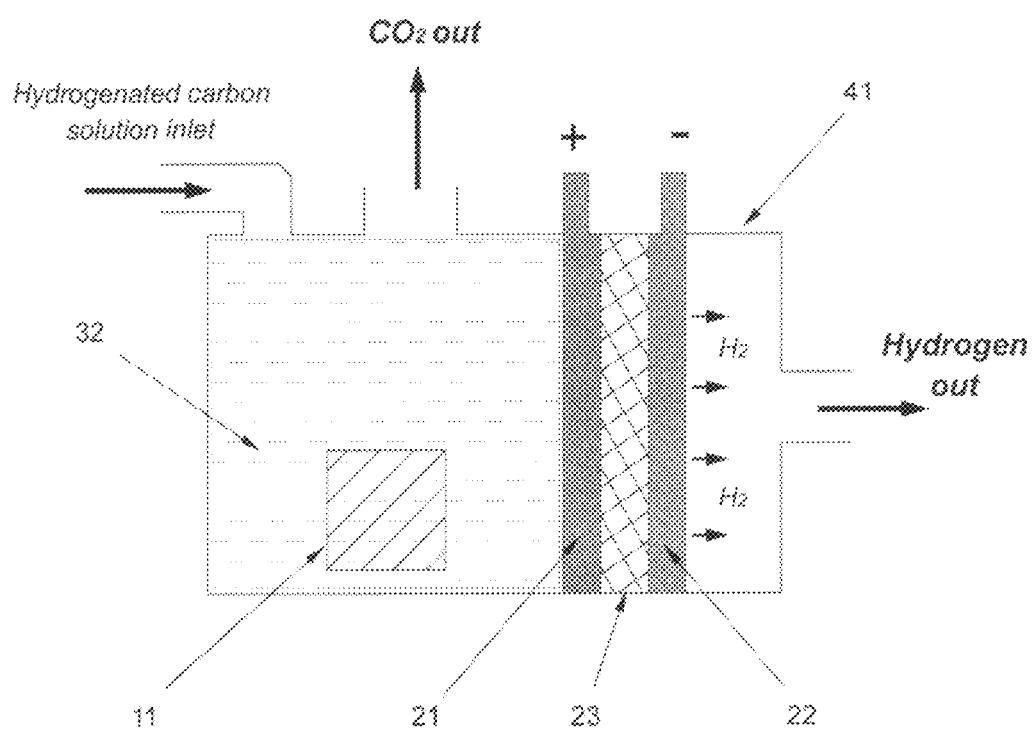
FIG. 2 is a schematic illustration showing another embodiment of the present invention with an IR-emitting ceramic immersed in electrolyte solution of a fuel cell, in which anode and cathode are separated by an electrolyte membrane.

According to the present invention, the hydrogen generator 41 can be a simple water electrolyzer comprising of an anode 21 and a cathode 22, as shown in FIG. 1. It may also be a more sophisticated electrolytic cell that has an integrated membrane-electrode assembly (MEA) which includes two catalyzed electrodes, an anode 21 and a cathode 22, each bonded to one side of a solid proton-conducting polymer electrolyte membrane (PEM) 23, as shown in FIG. 2. The proton conducting polymeric membrane 23 (the ionomeric membrane) is the most distinctive element of the polymer electrolyte membrane fuel cell (PEMFC).

The liquid electrolyte 32 used in hydrogen generator 41 as shown in FIG. 2 can be water, aqueous solution, acid or alkine electrolyte solution, aqueous solution of organic compounds or organic fuel, hydrocarbon fuel, or inorganic solution, whatever can be used to produce hydrogen. Most of these electrolyte solutions are infrared active and can be excited by the infrared in the wavelength range as disclosed in the present invention.

In applications, IR-emitting ceramic 11 can be simply immersed in the electrolyte solution without changing the specifications of the hydrogen generator 41, though some operation parameters may be optimized to obtain the best results possible.

CONCLUSION, RAMIFICATIONS, AND SCOPE

According to the present invention a system and a method for achieving efficient production of hydrogen in a hydrogen generator comprises at least a hydrogen generator, a liquid used in said hydrogen generator to produce hydrogen from, and a ceramic that emits infrared at wavelengths covering at least a portion of 3-20 micrometers range so that said liquid can be excited by infrared at said wavelengths before or during the production of hydrogen for improved production efficiency and reduced cost.

The invention has been described above. Obviously, numerous modifications and variations of the present invention are possible in light of the above teachings. Such variations are not to be regarded as a departure from the spirit and scope of the invention and all such modifications as would be obvious to one skilled in the art are intended to be included within the scope of the following claims.

I claim:

1. A system for achieving efficient production of hydrogen, comprising:
   a hydrogen generator having an anode and a cathode;
   a liquid used by said hydrogen generator to produce hydrogen from; and
   a ceramic that emits infrared at wavelengths covering at least 3.05 micrometers, 3.3 micrometers, and/or 4.65 micrometers; said infrared-emitting ceramic being disposed in contact with or at proximity of said liquid so that said liquid can be excited by said infrared before or during the production of hydrogen.

2. The system according to claim 1 wherein said ceramic consists of at least an oxide that emits infrared at said wavelengths.

3. The system according to claim 1 further comprising a pyroelectric material added to said ceramic.

4. The system according to claim 3 wherein said pyroelectric material is tourmaline.

5. The system according to claim 1 wherein said hydrogen generator is an electrolyzer.

6. The system according to claim 5 wherein said liquid is water, aqueous solution, electrolyte solution, hydrocarbon fuel, solution of hydrocarbon fuel, or solution of organic compounds.

7. The system of claim 6, wherein said wavelengths cover at least the infrared vibrational absorption spectrum of liquid water, and wherein said liquid used by said hydrogen generator is water, aqueous solution or electrolyte solution.

8. The system according to claim 1 wherein said hydrogen generator is a fuel reformer.

9. The system of claim 1, wherein said wavelengths cover at least the infrared vibrational absorption spectrum of liquid water.

10. The system of claim 2, wherein said wavelengths cover at least the infrared vibrational absorption spectrum of liquid water.

11. A method for achieving efficient production of hydrogen, comprising the steps of:
    providing a hydrogen generator having an anode and a cathode;
    providing a liquid used by said hydrogen generator to produce hydrogen from;
    providing a ceramic consisting of at least an infrared-emitting oxide that emits infrared at wavelengths covering at least 3.05 micrometers, 3.3 micrometers, and/or 4.65 micrometers so that said liquid can be excited by said infrared before or during the production of hydrogen; and
    generating hydrogen from the liquid.

12. The method of claim 11, wherein said wavelengths cover at least the infrared vibrational absorption spectrum of liquid water.

\* \* \* \* \*